(12) United States Patent
Belzile et al.

(10) Patent No.: US 10,315,260 B2
(45) Date of Patent: Jun. 11, 2019

(54) BLADE SHARPENING AND SETTING SYSTEM

(71) Applicant: Timbery LLC, Indianapolis, IN (US)

(72) Inventors: Luc Belzile, Shediac Cape (CA); John Storm, Roachdale, IN (US)

(73) Assignee: Wood-Mizer, LLC, Indianapolis, IN (US)

( * ) Notice: Subject to any disclaimer, the term of this patent is extended or adjusted under 35 U.S.C. 154(b) by 84 days.

(21) Appl. No.: 15/249,357

(22) Filed: Aug. 27, 2016

(65) Prior Publication Data

US 2017/0106460 A1   Apr. 20, 2017

Related U.S. Application Data

(60) Provisional application No. 62/211,426, filed on Aug. 28, 2015.

(51) Int. Cl.
*B23D 63/20* (2006.01)

(52) U.S. Cl.
CPC .................. *B23D 63/201* (2013.01)

(58) Field of Classification Search
CPC .................................................. B23D 63/201
See application file for complete search history.

(56) References Cited

U.S. PATENT DOCUMENTS

| | | | | |
|---|---|---|---|---|
| 2,498,167 A | * | 2/1950 | Lorenz | B23D 63/02 76/58 |
| 2,835,146 A | * | 5/1958 | Vollmer | B23D 63/12 76/41 |
| 3,308,688 A | * | 3/1967 | Stier | B23D 63/12 76/43 |
| 3,661,037 A | * | 5/1972 | Athanasoulas | B23D 61/121 76/35 |
| 4,072,068 A | * | 2/1978 | Idel | B23D 63/04 76/58 |
| 4,181,045 A | * | 1/1980 | Idel | B23D 63/005 72/342.1 |
| 5,471,897 A | * | 12/1995 | Wright | B23D 63/003 76/37 |
| 2006/0086208 A1 | * | 4/2006 | Gschwind, Sr. | B23D 63/02 76/58 |
| 2017/0106460 A1 | * | 4/2017 | Belzile | B23D 63/201 |

\* cited by examiner

*Primary Examiner* — Hwei-Siu C Payer
(74) *Attorney, Agent, or Firm* — Maginot, Moore & Beck LLP (57) ABSTRACT

A system for setting and sharpening teeth of a saw blade includes a frame, a sharpening assembly and a setting assembly. A block affixed to the frame defines at least in part a blade path. The sharpening assembly is configured to sharpen a first tooth of the saw blade in a first position of the blade path. The setting assembly configured to set the first tooth of the saw blade in a second position of the blade path, wherein the blade path is defined through the sharpening assembly and the setting assembly. An advancement assembly is configured to move the saw blade along the blade path in an advancement direction to advance teeth of the saw blade into and out of the first position, and into and out of the second position.

17 Claims, 9 Drawing Sheets

FIG. 11
PRIOR ART

BLADE SHARPENING AND SETTING SYSTEM

This application claims the benefit of U.S. Provisional Patent Application Ser. No. 62/211,426, filed Aug. 28, 2015.

TECHNICAL FIELD

This disclosure relates generally to band saws, and more particularly to maintenance systems for band saw blades.

BACKGROUND

Band saws are used for a broad range of range of cutting tasks, for example dimensioning rough lumber or cutting intricate and delicate shapes. Band saws include a motor configured to drive a circular band saw blade in a continuous loop through the object being cut. The band saw blade is a continuous loop of flexible metal with cutting teeth on one edge.

Figure 10:
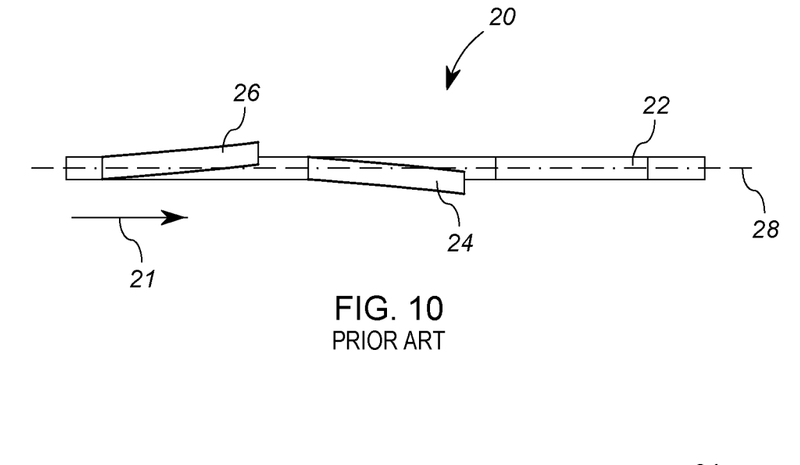
FIG. 10 is a top view of a portion of a conventional saw blade.
Figure 11:
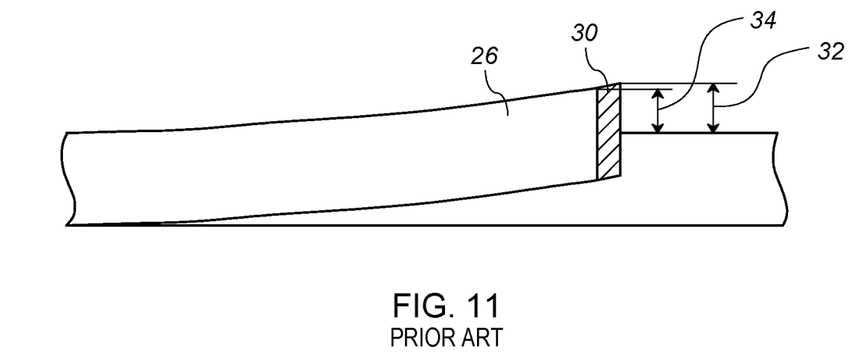
FIG. 11 is a top detail view of a tooth of the conventional saw blade of FIG. 10.

FIG. 10 illustrates a top view of a portion of a typical band saw blade 20. The band saw blade 20 is configured to travel in direction 21, and includes a plurality of teeth, including a first tooth 22, a second tooth 24, and a third tooth 26 shown in FIG. 10. The first tooth 22 is aligned with the center 28 of the saw blade, while the second and third teeth 24, 26 are offset from the center 28 of the saw blade. The displacement of each band saw tooth 24, 26 from the center 28 of the blade is known as the "set" of the tooth. FIG. 11 illustrates the set 32 of the saw tooth 26 in detail. This displacement provides clearance for the blade body to pass through the object being cut and aids in the removal of the waste material from the saw blade 20. The opposing offset of teeth 24, 26 provides equal clearance and dynamic forces on each side of the saw blade 20 as it passes thru the material to be cut and aids the blade in tracking in a straight line through the cut.

Increasing the set of a tooth increases the amount of material removed by the tooth, while reducing the set of a blade tooth reduces the material removed by the tooth. A precise set is desirable since a band saw blade with too much set on each cutting tooth removes more material than necessary, requires more power to drive, and will dull more quickly. Conversely, a blade with too little set will bind and burn in the saw cut kerf.

Over time, the saw blade 20 dulls due to normal wear. The blade 20 must therefore be sharpened periodically to maintain its cutting efficacy. Sharpening is typically performed by grinding off a portion of the tip off the tooth such that a sharp edge remains. FIG. 11 depicts, not to scale, a portion 30 of the saw tooth 26 removed during sharpening. As can be seen, due to the sharpening of the saw tooth 26, the initial set displacement 32 is reduced to a smaller set displacement 34. As a result, after sharpening the saw blade 20, the teeth of the saw blade must be re-set so that the offset of the teeth remains at the desired set position.

After sharpening, therefore, the saw blade must be removed from the sharpener and moved to a setting apparatus. The saw blade is clamped into the separate setting apparatus and the teeth of the saw blade are re-set to the desired offset position. The sharpener and the setting apparatus both require space in the shop. Moreover, removing the saw blade from the sharpener, moving the blade to the setting apparatus, and then clamping the saw blade in the setting apparatus is time consuming for the user performing the maintenance.

What is needed, therefore, is a band saw sharpening and setting assembly having a reduced footprint and that enables more efficient sharpening and setting of a band saw blade.

SUMMARY

A system and method for sharpening and setting teeth of a saw blade according to the disclosure has a reduced footprint and improved the efficiency of sharpening and setting a band saw blade.

In one embodiment, a system for setting and sharpening teeth of a saw blade includes a frame, a sharpening assembly and a setting assembly. A block affixed to the frame defines at least in part a blade path. The sharpening assembly is configured to sharpen a first tooth of the saw blade in a first position of the blade path. The setting assembly configured to set the first tooth of the saw blade in a second position of the blade path, wherein the blade path is defined through the sharpening assembly and the setting assembly. An advancement assembly is configured to move the saw blade along the blade path in an advancement direction to advance teeth of the saw blade into and out of the first position, and into and out of the second position. The system comprises a sharpening assembly configured to sharpen a first tooth of the saw blade in a first position of a blade path and a setting assembly configured to set the first tooth of the saw blade in a second position of the blade path, wherein the blade path is defined through the sharpening assembly and the setting assembly. The system further includes an advancement assembly configured to move the saw blade along the blade path in an advancement direction to advance teeth of the saw blade into and out of the first position, and into and out of the second position.

In another embodiment, a method of sharpening and setting teeth of a saw blade according to the disclosure positioning a saw blade in a blade path defined through a sharpening assembly and a setting assembly, sharpening a first tooth of the saw blade in a first position of a blade path with the sharpening assembly, moving the saw blade along the blade path in an advancement direction from the first position to a second position of the blade path with an advancement assembly, and setting the first tooth of the saw blade in the second position with the setting assembly.

The above described features and advantages, as well as others, will become more readily apparent to those of ordinary skill in the art by reference to the following detailed description and accompanying drawings.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
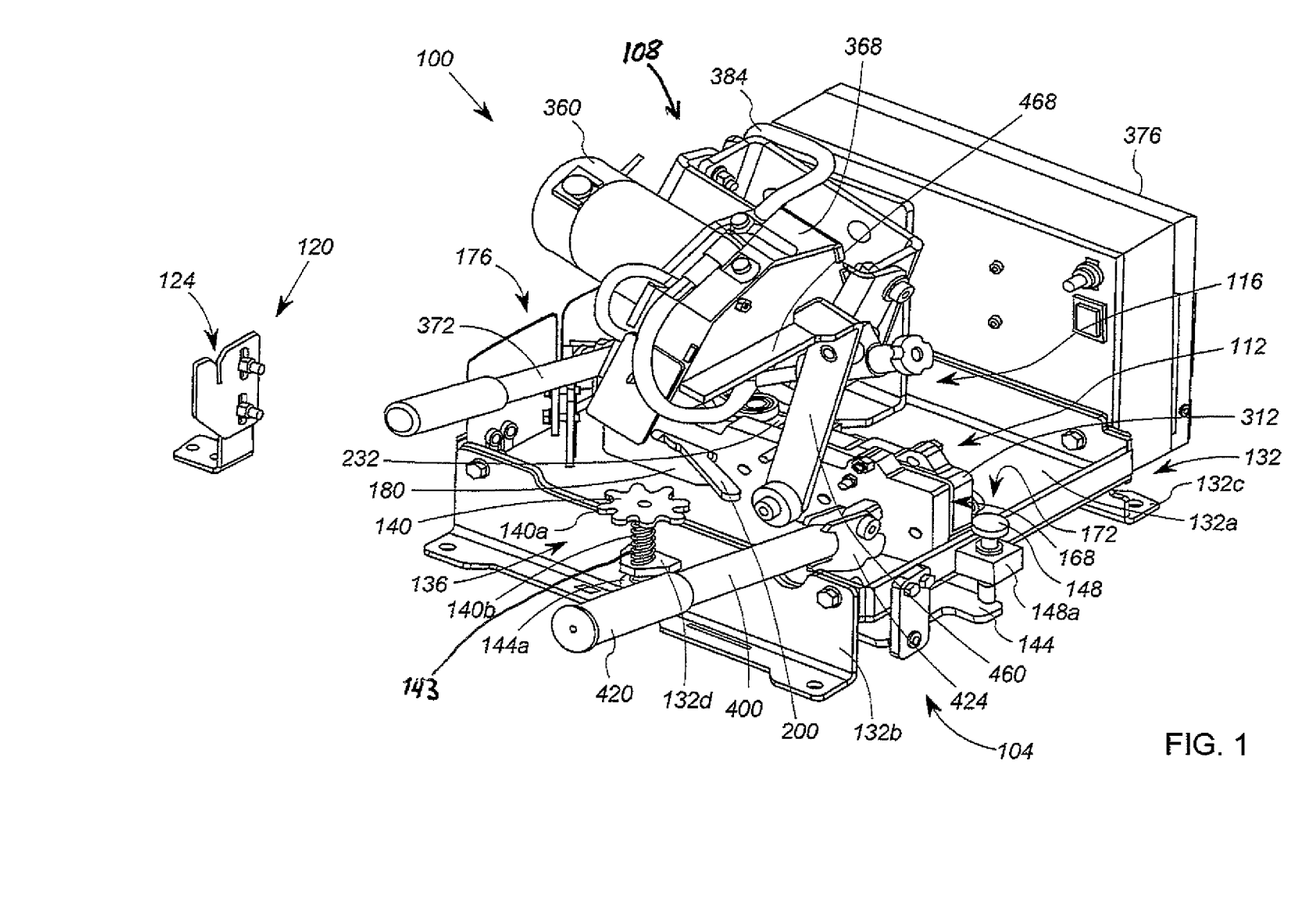
FIG. 1 is a front perspective view of a sharpening and setting system according to the disclosure.
Figure 2:
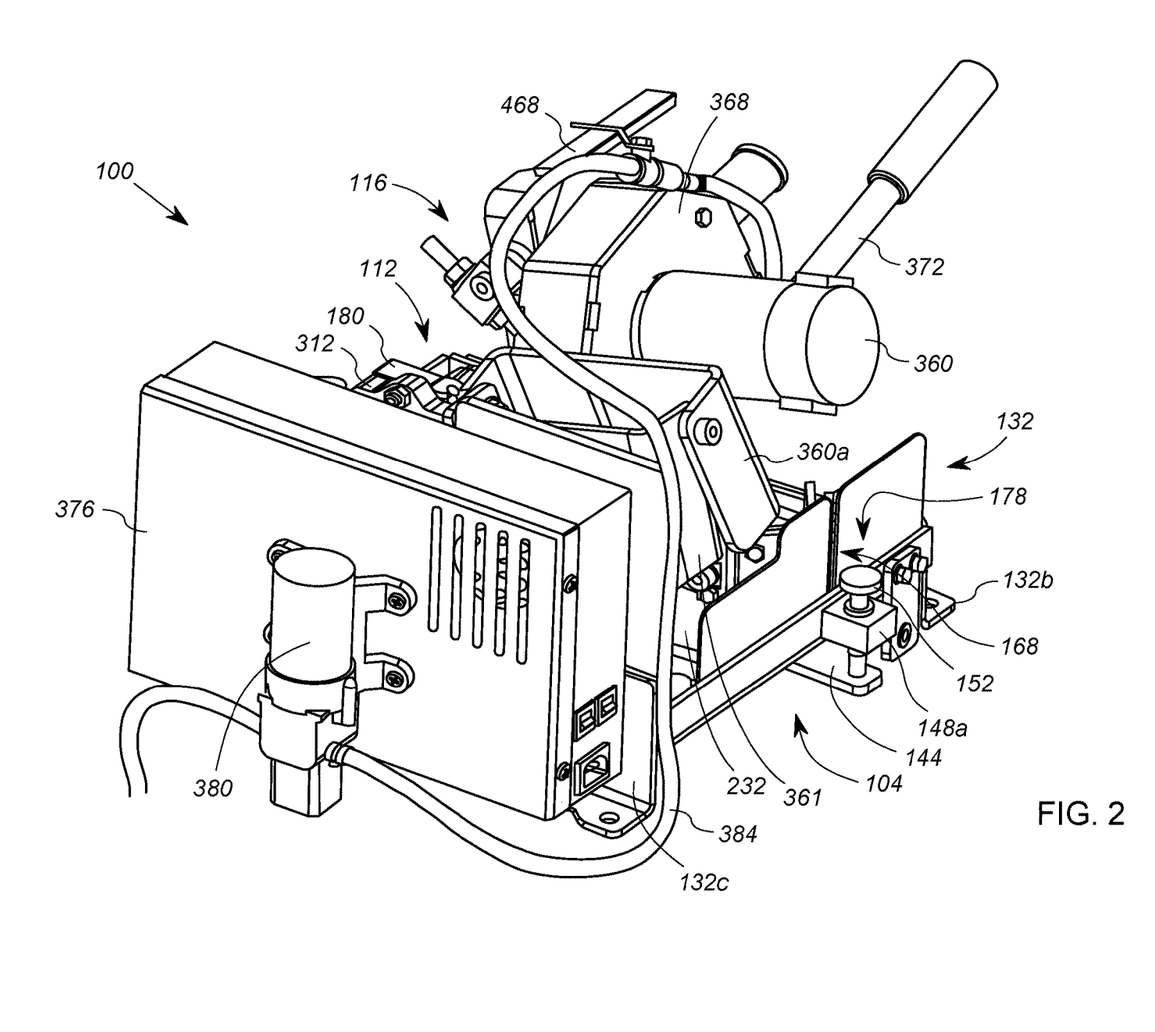
FIG. 2 is a rear perspective view of the sharpening and setting system of FIG. 1.

FIGS. 1 and 2 illustrate front and rear perspective views, respectively, of a sharpening and setting system 100 for a band saw blade. The sharpening and setting system 100 includes a base assembly 104, a sharpening assembly 108, a setting assembly 112, and an advancement assembly 116. In some embodiments, the sharpening and setting system 100 also includes one or more blade supports 120 (only one is shown in FIG. 1) fixedly mounted to the table or workbench on which the sharpening and setting assembly 100 is mounted. The blade supports 120 define a slot 124 configured to receive a saw blade to retain the saw blade along a desired path. The blade supports 120 are spaced apart from the base assembly.

The base assembly 104 includes a frame structure 132, which is fixedly mounted to a supporting surface (not shown), for example a table or workbench, and a blade height adjustment subassembly 136 configured to adjust the height of the saw blade relative to the sharpening and setting assemblies 108, 112. The frame structure 132 includes a bottom plate 132a, and opposing L-shaped plate supports 132b, 132c that are secured to and elevate the bottom plate 132a.

The blade height adjustment subassembly 136 includes a blade height adjustment actuator 140, a base plate 144, and two blade support posts 148, 152. The base plate 144 is disposed below and substantially parallel to the bottom plate 132a. In the embodiment illustrated in FIGS. 1 and 2, the blade height adjustment actuator 140 is a knob 140a adapted to be turned manually by a user, fixedly coupled to a shaft 140b.

The blade height adjustment actuator 140 is rotatable. The shaft 140b extends through a boss 132d of the L-shaped support 132b, and is operably coupled to a boss 144a of the base plate 144 that extends through an opening, not visible in FIG. 1, in the L-shaped support 132b. The shaft 140b is operably coupled to the boss 144a of the base plate 144 to cause vertical movement of the base plate 144 with respect to the frame 132 upon rotation of the blade height adjustment actuator 140. Thus, for example, the shaft 140b and the boss 144a may suitably be threadingly engaged, effectively forming a worm gear mechanism to move the base plate 144. It is noted that in this embodiment, a coil or spring 143 is located around the upper part of the shaft 140b engaging the top of the boss 132d and the knob 132a to maintain the vertical position of the actuator with respect to the frame 132 as the actuator is rotated and moves the base plate 144.

The blade support posts 148, 152 are fixedly supported by the base plate 144 and are laterally constrained by extending through bosses 148a of the frame 132. Thus, vertical adjustment of the base plate 144 by the actuator 140 causes vertical adjustment of both blade support posts 148, 152 in unison. The bosses 148a on the frame 132 provide lateral support to the plate 144. Each blade support post 148, 152 includes an upper surface 156, 160, on which the saw blade is configured to rest such that a saw blade path 168 having a first end 172 and a second end 176 is defined through the sharpening and setting assemblies 108, 112 between the first and second blade support posts 148, 152.

It will be appreciated that the base plate 144 may be replaced by other linking mechanism, such as a T-shaped rod member that extends to support each post 148, 152, and extends to and includes a boss similar to the boss 144a. Other suitable linkage structures that fixedly couple the support posts 148, 152 to a boss that receives the shaft 140b of the actuator 140 may also be used.

Figure 4:
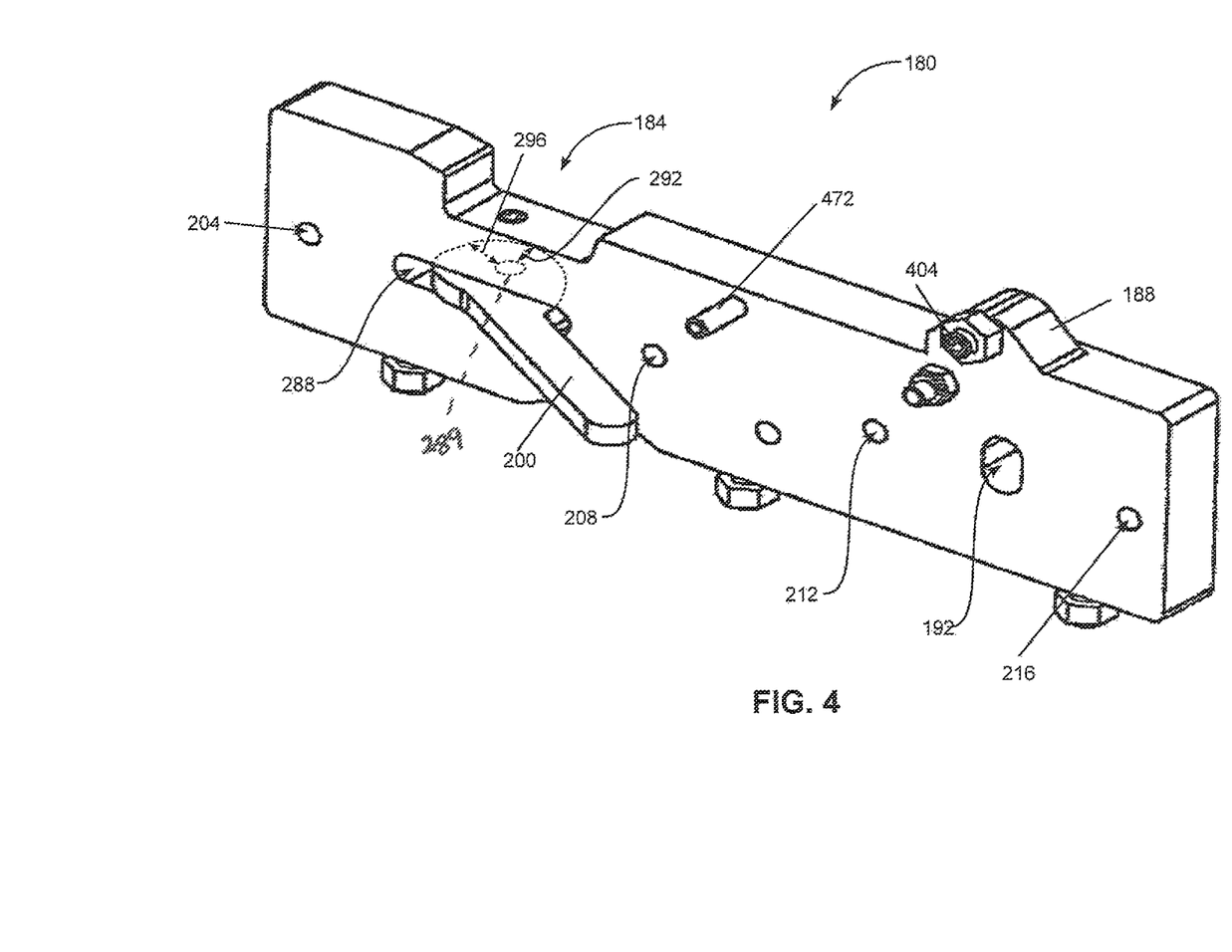
FIG. 4 is a front perspective view of the main block and clamp lever of the sharpening and setting system of FIG. 1.

A main block 180, shown in more detail in FIG. 4, is affixed to and supported by the frame 132 adjacent the blade path 168. To this end, the main block 180 in part defines the blade path 168 and guides the blade through the blade path 168. The main block 180 is generally rectangular, having a sharpening depression 184 defined in the upper surface and a first set screw projection 188 extending upwardly from the upper surface. The main block 180 further defines a setting handle opening 192 and a clamp opening 288 extending through the main block 180. A clamp lever 200, which will be discussed in further detail below, is pivotably positioned in the clamp opening 288. The main block 180 also defines four threaded openings 204, 208, 212, 216 spaced apart along a longitudinal length of the main block 180.

Figure 3:
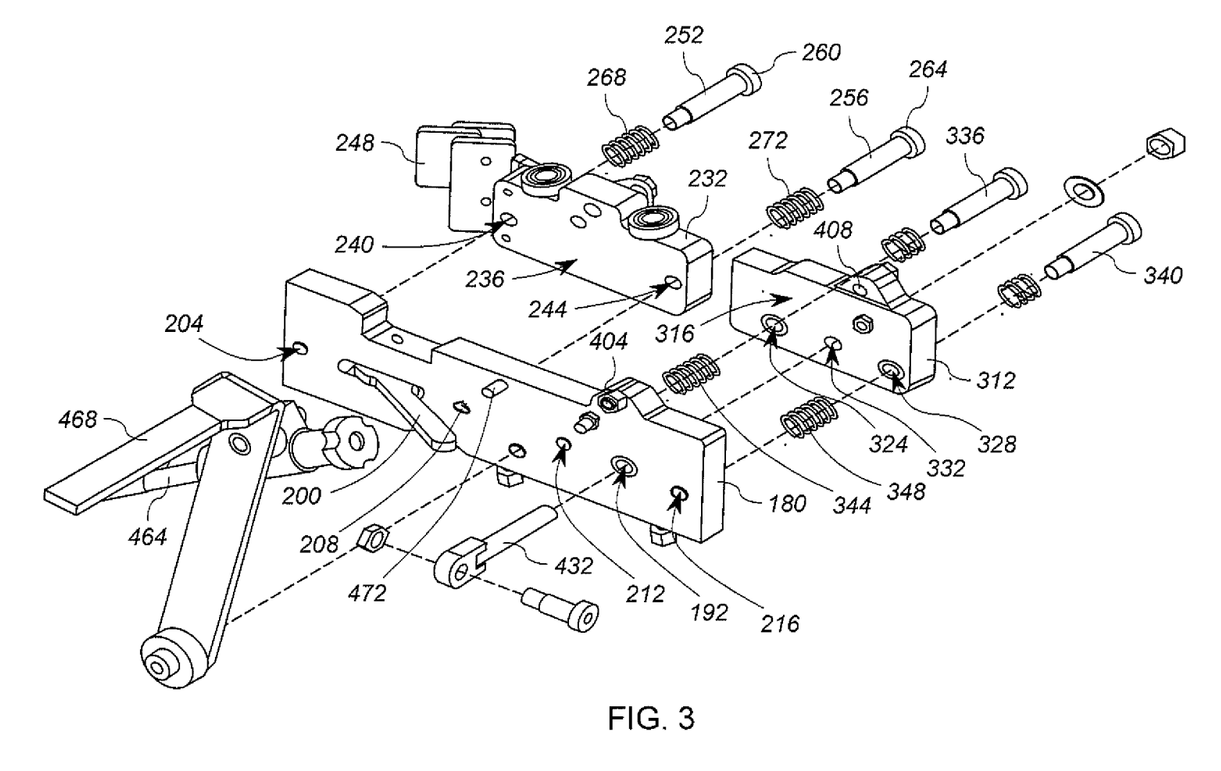
FIG. 3 is an exploded view of the advancement assembly, main block, clamping block, and setting block of the sharpening and setting system of FIG. 1.
Figure 5:
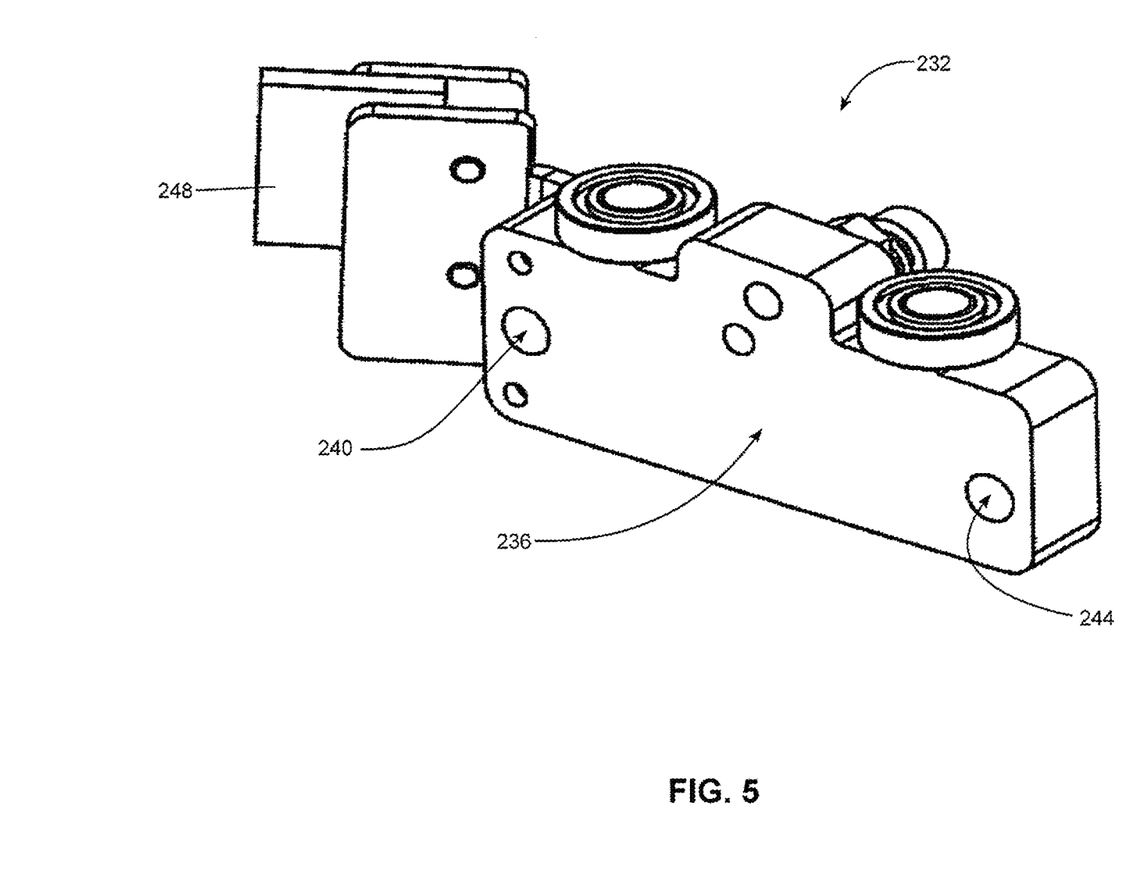
FIG. 5 is a front perspective view of the clamping block of the sharpening and setting system of FIG. 1.

As illustrated in FIGS. 1-3, a clamping block 232 is positioned opposite the blade path 168 from the main block 180 adjacent an end region of the main block nearest the second end 176 of the blade path 168. The clamping block 232 thereby defines in part the blade path 168 in cooperation with the main block 180. The clamping block 232, shown in further detail in FIG. 5, includes a clamping surface 236 facing the main block 180 and defines two openings 240, 244, which are generally aligned with the threaded openings 204, 208, respectively, of the main block 180. A wiper 248 configured to remove lubricant from the saw blade 20 is attached to the end of the clamping block 232 nearest the second end 176 of the blade path 168.

With particular reference to FIG. 3, the clamping block 232 is attached to the main bock 180 via two threaded members 252, 256, each of which extends through an associated one of the openings 240, 244 and is threaded into the threaded opening 204, 208, respectively, of the main block 180. The threaded members 252, 256 enable the clamping block 232 to move relative to the main block 180 in a direction generally normal to the clamping surface 236. The threaded members 252, 256 each include a shoulder 260, 264 on a side of the threaded member 252, 256 opposite the end threaded into the opening 204, 208, and a spring 268, 272 is positioned around each threaded member 252, 256 between the shoulder 260, 264 and the clamping block. The springs 268, 272 compressed between the shoulder 260, 264 and the clamping block 232 such that the springs 268, 272 bias the clamping block 232 toward the main block 180.

The clamp lever 200 includes a handle portion and a cam head. The cam head includes a central opening through which the clamp lever 200 is pivotably connected to the main block 180. The clamping lever 200 thereby rotates about the central opening 289 relative to the main block 180 to place the clamping block 232 in either an open position or a closed position. An outer surface of the cam head of the clamping lever 200 engages the clamping surface 236 of the clamping block 232.

In the closed position of the clamping lever 200, as shown in FIGS. 1, 3, and 4, the portion of the cam head that engages the clamping surface 236 has a relatively reduced radius or width 292 as measured from the central opening 289. In this position, the springs 268, 272 bias the clamping block 232 toward the main block 180 to clamp a saw blade between the clamping block 232 and the main block 180. To move the clamping block 232 into the open position, the clamping lever 200 is rotated to the left in the views of FIGS. 1, 3, and 4. As a result, a portion of the cam head having a larger radius or width 296 from the central opening 289 engages the clamping surface 236, thereby camming the clamping surface 236 away from the main block 180 and overcoming the spring bias of the springs 268, 272. The clamping lever 200 thus forces the clamping block 232 away from the main block 180, opening the clamp and releasing the saw blade or enabling a saw blade to be positioned between the main block 180 and the clamping block 232.

Figure 6:
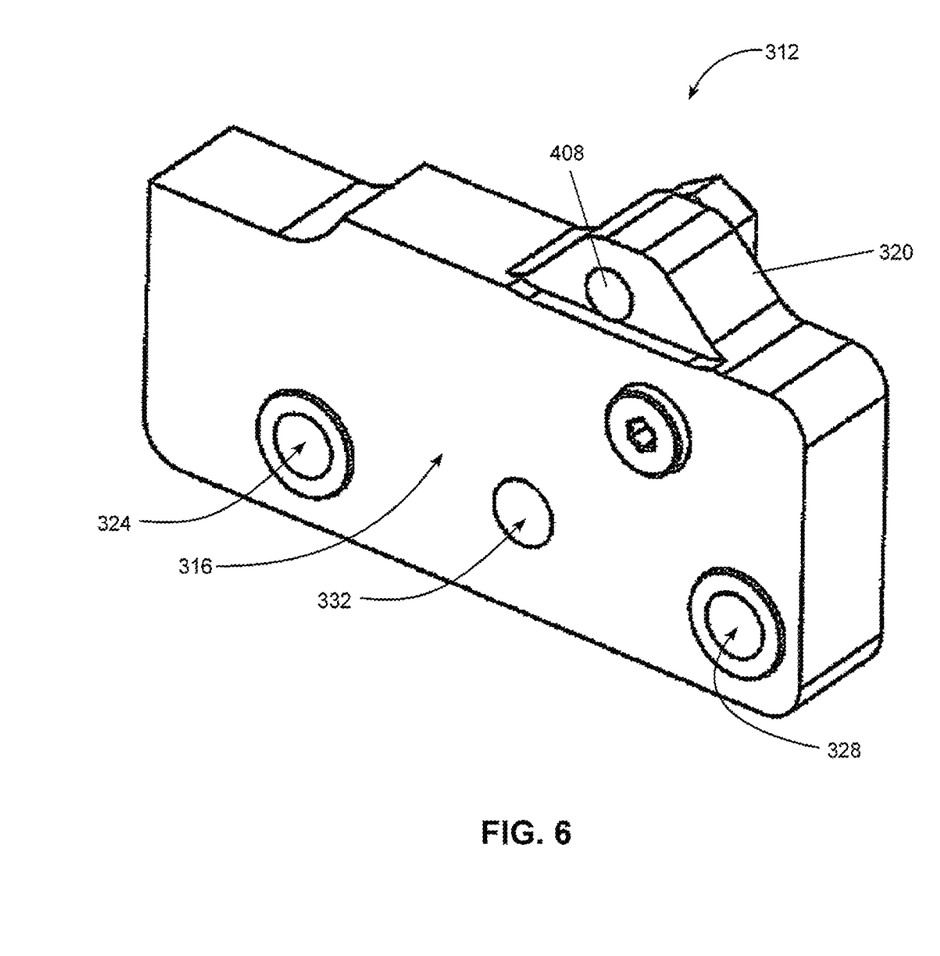
FIG. 6 is a front perspective view of the setting block of the sharpening and setting system of FIG. 1.

As illustrated in FIGS. 1, 3, and 6, a setting block 312 is positioned opposite the main block 180 from the blade path 168. The setting block 312 thereby defines in part the blade path 168 in cooperation with the main block 180. The setting block 312 includes a clamping surface 316 and a second set screw projection 320. The setting block 312 defines two openings 324, 328 aligned with the threaded openings 212, 216, respectively, of the main block 280, and a handle opening 332 aligned with the setting handle opening 192 of the main block 180.

The setting block 312 is attached to the main bock 180 via two threaded members 336, 340, each of which extends through an associated one of the openings 324, 328 and is threaded into the threaded opening 212, 216, respectively, of the main block 180. The threaded members 336, 340 enable the setting block 232 to move relative to the main block 180 in a direction generally normal to the clamping surface 316. A spring 344, 348 is positioned around each threaded member 336, 340, respectively, between the main block 180 and the setting block 312. The springs 344, 348 are configured to bias the setting block 312 away from the main block 180.

Figure 7:
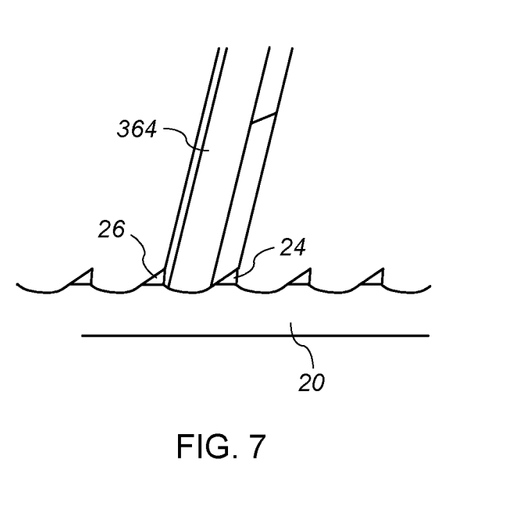
FIG. 7 is a side view of the grinding wheel of the sharpening assembly of the sharpening and setting system of FIG. 1 engaged with a tooth of a saw blade.

Referring now to FIGS. 1, 2, and 7, the sharpening assembly 108 includes a motor 360, a grinding wheel 364 (FIG. 7) located in a grinding wheel housing 368, a sharpening actuator 372, a power supply 376, and a pump 380. The sharpening assembly 108 is mounted on and supported by the frame 132. To this end, the motor 360 is rotatably connected via a mounting plate 360*a* to a motor mount 361 that is affixed to the frame 132. The sharpening actuator 372 and grinding wheel housing 368 are affixed to the motor 360. The power supply 376 is mounted to the L-shaped plate 132*c*, and the pump 380 is mounted directly on the housing of the power supply 376.

The motor 360 is operably connected to the grinding wheel 364 and configured to rotationally drive the grinding wheel 364. The sharpening actuator 372 is fixedly connected to the motor 360 and the grinding wheel housing 368 and is configured to enable raising and lowering of the motor 360 and grinding wheel housing 368. In the illustrated embodiment, the sharpening actuator 372 is a manually operated handle. In other embodiments, the motor 360 is operably connected to the sharpening actuator to automatically operate the sharpening actuator to raise and lower the grinding wheel 364.

The power supply 376 includes electrical components, circuit breakers, and switches to control the supply of electrical power to the motor 360 and pump 380. The pump 380 is fluidly connected via hoses 384 to a lubricant reservoir (not shown) and is configured to move lubricant from the reservoir to the saw blade adjacent the grinding wheel 364 to lubricate the saw blade during sharpening.

With reference now to FIGS. 1, 4, 6, and 8, the setting assembly 112 includes a setting actuator 400, a first set screw 404, and a second set screw 408. The setting assembly 112 is also supported on the frame 132, largely through other structures that are mounted to the bottom plate 132*a*.

Figure 8:
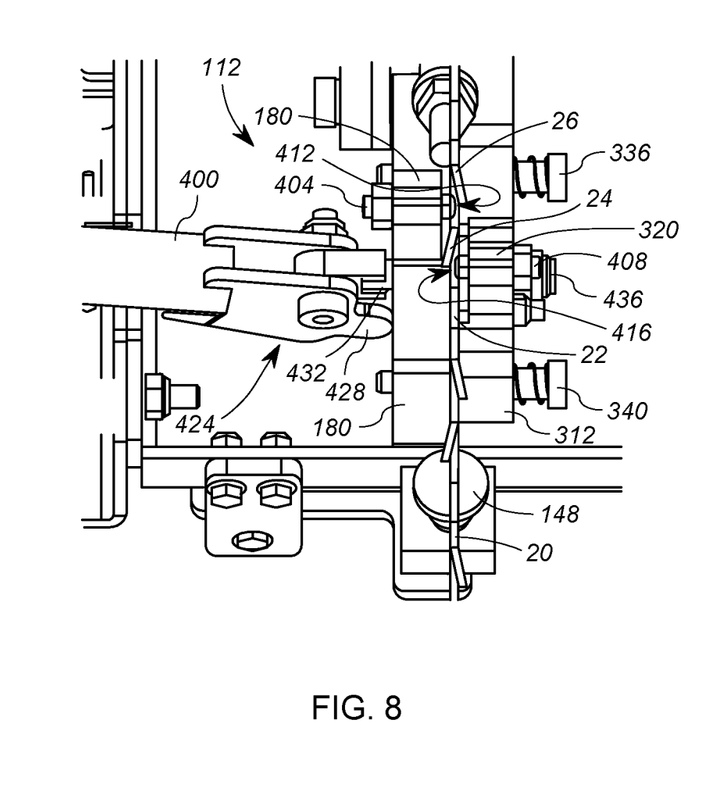
FIG. 8 is a top view of the setting assembly of the sharpening and setting system of FIG. 1 with a saw blade positioned between the main block and setting block.

In the setting assembly 112, the first set screw 404 extends through the first set screw projection 188 of the main block 180, while the second set screw 408 extends through the second set screw projection 320 of the setting block 312. Each set screw 404, 408 includes a setting end 412, 416, respectively, configured to exert a force on the respective tooth to set the position of the tooth.

The setting actuator 400 includes a handle end 420, which is configured to be manipulated by a user, and a clamping end 424. The clamping end 424 includes a flange portion 428 extending in a direction toward the main block 180 and is rotatably connected to a bolt 432 that extends through the setting handle openings 192, 332 of the main block 180 and setting block 312, respectively. The bolt 432 is held against the side of the setting block 312 opposite the clamping surface 316 by a nut 436.

Figure 9:
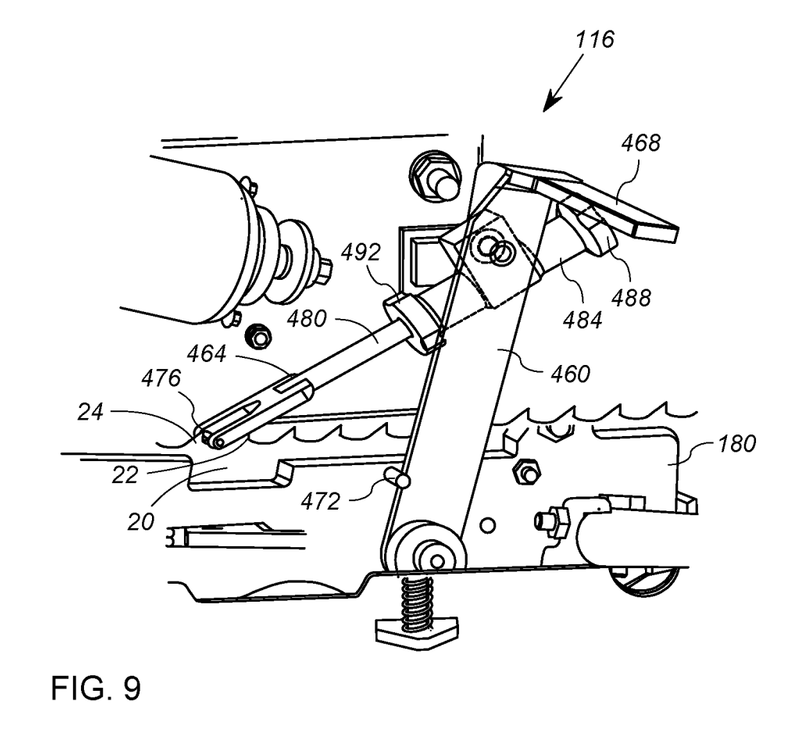
FIG. 9 is a front perspective view of the advancement assembly of the sharpening and setting system of FIG. 1.

With reference to FIG. 9 and continuing reference to FIGS. 1 and 2, the advancement assembly 116 includes an advancement lever 460 and a push pawl 464. The advancement lever 460 is rotatably connected to the main block 180 and includes an advancement handle 468 configured to be manipulated by a user. A stop pin 472 extends from the main block 180 to define a maximum rotation of the advancement lever 460 in the counterclockwise direction, as viewed in FIG. 9. Although the illustrated embodiment includes a manually operated advancement lever 460, in some embodiments, the advancement lever 460 is operably connected to the motor 360 such that the motor 360 automatically operates the advancement lever 460.

The push pawl 464 includes a first end operably connected to the advancement lever 460 and a second end having a pawl pin 476 configured to engage a tooth, for example tooth 24 of the saw blade 20. The push pawl 464 further includes a lower section 480 and an upper section 484, which are movable relative to one another along an axial direction of the push pawl 464. A coarse adjustment knob 488 is configured to selectively clamp the lower section 480 and the upper section 484 to one another to enable adjustment of the advancement distance. The push pawl 464 also includes a fine adjustment knob 492 operably connected to the lower section 480 and the upper section 484 configured to enable fine adjustments of the relative axial position of the lower section 480 and the upper section 484.

During normal cutting operations, the saw blade 20 can become dull, reducing the cutting efficiency of the blade 20. As such, it is necessary periodically to sharpen the blade to maintain the cutting efficacy of the saw blade 20.

To sharpen the saw blade 20, the user positions the saw blade 20 in the slot 124 of the blade supports 120 to retain the saw blade 20 in a fixed path. The user then opens the clamping lever 200 by rotating the clamping lever 200 to the left in the view of FIG. 1 such that the clamping lever 200 pushes the clamping block 232 away from the main block 180, against the force of the springs 268, 272 (FIG. 3).

The user positions the saw blade 20 in the blade path 168 (FIG. 1) between the main block 180 on one side and the clamping block 232 and the setting block 312 on the other side. Next, the blade height is set by turning the blade height adjustment actuator 140 to raise and/or lower the blade support posts 148, 152 until the blade is set to a height at which the grinding wheel 364 fits into the gullet between the teeth of the saw blade 20, as shown in FIG. 7. The user then rotates the clamping lever 200 to the right in the view of FIG. 1, allowing the springs 268, 272 to press the clamping block 232 and the clamping surface 236 against the saw blade 20, holding the saw blade 20 at a fixed position in the blade path 168.

Next, the user sets the advancement distance of the advancement assembly 116. The user positions the advancement lever 460 against the stop pin 472 and adjusts the coarse and/or fine adjustment knobs 488, 492 such that the pawl pin 476 rests against a saw tooth, for example tooth 24 (FIG. 9) in the gullet.

After the blade 20 is positioned and the advancement distance is set, the user operates the setting and sharpening system 100 to sharpen the teeth of the saw blade 20. The user activates the motor 360 and pump 380 by, for example, actuating a switch on the power supply 376. The pump 380 moves a lubricant onto the saw blade 20, while the motor 360 spins the grinding wheel 364.

The grinding wheel 364 is lowered into contact with the tooth, for example tooth 26 in FIG. 7, of the saw blade 20, grinding a portion of the tooth 26. The grinding wheel 364 sharpens the tooth 24 by removing a portion of material from the tooth 26 and leaving a sharp edge at the tip of the tooth 26. The lubricant moved onto the saw blade 20 in the vicinity of the grinding wheel 364 reduces friction from the grinding wheel and enables more precise sharpening while reducing heat buildup in the saw blade 20. If desired, the grinding wheel 364 may be lowered into contact with the tooth 26 multiple times to ensure optimal sharpening.

The user then advances the blade 20 by one tooth by actuating the advancement assembly 116. The advancement handle 468 is pivoted in the counter-clockwise direction, moving the pawl pin 476 to the right in the view of FIG. 9 until the pawl pin 476 passes over the previous tooth, for example tooth 22 in the view of FIG. 9. The user then pushes the handle 468 to the left in the view of FIG. 9, moving the pawl pin 476 into engagement with the tooth 22. The advancement lever 460 pushes the pawl pin 476 to move the saw blade 20 to the left, overcoming the frictional hold of the clamp lever 200. The advancement lever 460 moves until it engages the stop pin 472, at which point the saw blade 20 has been advanced by one tooth. The user then repeats the sharpening and advancing of the blade 20 until each tooth on the saw blade 20 has been sharpened.

As discussed above, after sharpening the teeth of the saw blade, the set distance of the teeth has been reduced due to the removal of a portion of material from the teeth. As such, it is advantageous to set the teeth of the saw blade 20 after sharpening so that the teeth remain at the desired offset distance. In the sharpening and setting system 100 of the present disclosure, the saw blade 20 need not be removed from the assembly between sharpening and setting operations. Instead, the setting operation can be performed immediately after the sharpening has been completed, enabling the teeth of the saw blade to be sharpened and set in less time than in conventional sharpening systems and setting systems.

The reader should appreciate, however, that the sharpening and setting system 100 may be used to set the teeth of the saw blade 20 without sharpening the blade 20 prior. In this instance, the blade is positioned in the blade path 168 and the advancement distance is set in a similar manner as described above prior to the setting of the teeth of the saw blade 20.

To begin a setting operation, the saw blade 20 is advanced to a position, illustrated in FIG. 8, at which a right offset tooth 26 is aligned with the setting end 412 of the first set screw 404 and a left offset tooth 24 is aligned with the setting end 416 of the second set screw 408. The setting distance is adjusted by screwing each of the first and second set screws 404, 408 to the desired setting distance.

The user then sets the teeth 24, 26 by pressing downwardly on the handle 420 of the setting actuator 400. The downward motion of the setting actuator 400 presses the flange 428 of the clamping end 424 of the actuator 400 into the main block 180, moving the setting actuator 400, the bolt 432 and nut 436 to the left in the view of FIG. 8. The engagement of the nut 436 with the setting block 312 forces the setting block 312 to move to the left in the view of FIG. 8 against the force of the springs 344, 348, clamping the saw blade 20 between the setting block 312 and the main block 180. The setting end 412 of the first set screw 404 presses the tooth 26 away from the central axis of the saw blade 20 to the desired offset distance. The setting end 416 of the second set screw 408 simultaneously presses the tooth 24 away from the central axis of the saw blade 20 in the opposite direction to the desired offset distance.

Upon release of the handle 420, the springs 344, 348 (FIG. 3) urge the setting block 312 out of contact with the saw blade 20 and return the setting handle 420 to the initial position. The user then advances the saw blade 20 three teeth by actuating the advancement handle 468 three times, each actuation advancing the saw blade 20 by one tooth, and actuates the setting handle 420 again to set the next three teeth. The process is repeated until all teeth in the saw blade 20 have been set at the desired offset distance.

While the illustrated embodiment depicts manually operated sharpening, setting, and advancement assemblies 108, 112, 116, the reader should appreciate that in some embodiments the sharpening, setting, and advancement assemblies 108, 112, 116 are operated automatically. In such an embodiment, one or more motors are operably connected to the sharpening actuator 372, the advancement lever 460, and the setting actuator 400 to move the grinding wheel 364, the push pawl 464, and the setting block 312, respectively, to automatically sharpen, advance, and set the saw blade 20. In one particular embodiment, the sharpening and setting assembly includes a transmission assembly that enables the motor 360 to operate the sharpening, advancement, and setting assemblies 108, 116, 112. In another particular embodiment, the system includes a controller that operates the one or more motors to perform the sharpening, the advancement, and the setting of the saw blade without user intervention.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A system for setting and sharpening teeth of a saw blade comprising:
   a frame having a first block affixed thereto, the first block defining at least in part a blade path;
   a grinding wheel, a motor operably coupled to drive the grinding wheel, the grinding wheel configured to sharpen a first tooth of the saw blade in a first position of the blade path;
   an actuator operably coupled to drive at least one tooth setting clamp to set the first tooth of the saw blade in a second position of the blade path, wherein the blade path is defined through the first position and the second position; and
   a lever pivotably connected to the frame, and a push pawl pivotably connected to the lever, the lever and the push pawl configured to move the saw blade along the blade path in an advancement direction to advance teeth of the saw blade into and out of the first position, and into and out of the second position;
   wherein the at least one tooth setting clamp further comprises
      a first tooth setting clamp configured to clamp the first tooth and set a first lateral position of the first tooth in the first position, and
      a second tooth setting clamp configured to clamp a second tooth of the saw blade to set a second lateral position of the second tooth of the saw blade concurrently with the setting of the first lateral position;
   wherein the second set position is in an opposite direction relative to the first set position from a blade path plane defined centrally along the blade path in the advancement direction;
   wherein the frame supports the motor and the actuator; and
   the system further comprising
      a second block positioned adjacent to a second side of the blade path plane; and
   wherein the first block includes the first tooth setting clamp and is disposed adjacent to a first side of the blade path, and
   wherein the system further includes a third block positioned adjacent to the second side of the blade path plane, the third block including the second tooth setting clamp.

2. The system of claim 1, wherein the first block is fixedly connected to the frame and the third block is movable relative to the first block in a direction transverse to the blade path plane.

3. The system of claim 2, wherein:
   the actuator is operably connected to the third block and configured to clamp the third block into the first block to close the first tooth setting clamp and the second tooth setting clamp.

4. The system of claim 1, further comprising:
   a clamp lever rotatably connected to the first block, and having a camming head; and wherein,
   the second block is operably connected and spring biased towards the first block; and
   the camming head is configured to move the second block away from the first block in a first position of the camming head.

5. The system of claim 1, further comprising:
   a sharpening actuator operably connected to the grinding wheel and configured to move the grinding wheel into and out of contact with a tip of the first tooth.

6. The system of claim 5, further comprising:
   a pump configured to move a fluid onto the saw blade, the pump supported on the frame.

7. The system of claim 1, wherein:
   the push pawl has a first end and a second end, the first end being configured to engage the tooth of the saw blade; and
   an advancement actuator including the lever operably connected to the second end of the push pawl and configured to press the push pawl against the tooth to move the saw blade in the advancement direction by an integer number of teeth.

8. The system of claim 7, wherein the integer number of teeth is one tooth.

9. A system for setting and sharpening teeth of a saw blade comprising:
   a frame;
   a grinding wheel, a motor operably coupled to drive the grinding wheel, the grinding wheel supported by the frame and configured to sharpen a first tooth of the saw blade in a first position of a blade path;
   an actuator operably coupled to drive at least one tooth setting clamp supported by the frame to set the first tooth of the saw blade in a second position of the blade path, wherein the blade path is defined through the first and second positions;
   a pawl supported by the frame and configured to move the saw blade along the blade path in an advancement direction to advance teeth of the saw blade into and out of the first position, and into and out of the second position; and
   a blade height adjustment subassembly including at least a first blade support, a linking member, and a height adjustment actuator including a shaft, the shaft engaging the frame and the linking member and configured to cause relative vertical movement therebetween responsive to actuation of the height adjustment actuator, and wherein said linking member is configured to translate the relative vertical movement to the first blade support.

10. The system of claim 9, wherein the linking member comprises a plate, and wherein the first blade support is affixed to the plate.

11. The system of claim 10, further comprising a second blade support affixed to the plate; and wherein,
   the first blade support and the second blade support are located at opposing ends of the blade path, and
   the plate is configured to translate the vertical relative movement to the second blade support.

12. The system of claim 11, wherein the frame includes a first boss for receiving the shaft therethrough, and a second boss for receiving the first blade support therethrough and a third boss for receiving the second blade support therethrough.

13. The system of claim 9, further comprising:
   a retaining clamp configured to retain the saw blade at a fixed position in the blade path, the retaining clamp including at least a portion of a first block and an opposing clamp block, wherein the portion of the first block and the clamp block define at least in part the blade path therebetween, and wherein the first block is affixed to the frame.

14. The system of claim 9, wherein the actuator is coupled to and supported by the frame.

15. The system of claim 9, wherein the at least one tooth setting clamp further comprises:
- a first tooth setting clamp configured to clamp the first tooth and set a first lateral position of the first tooth in the first position; and
- a second tooth setting clamp configured to clamp a second tooth of the saw blade to set a second lateral position of the second tooth of the saw blade concurrently with the setting of the first lateral position,
- wherein the second set position is in an opposite direction relative to the first set position from a blade path plane defined centrally along the blade path in the advancement direction.

16. The system of claim 9, further comprising:
- a sharpening actuator operably connected to the grinding wheel and configured to move the grinding wheel into and out of contact with a tip of the first tooth.

17. The system of claim 16, further comprising:
- a pump configured to move a fluid onto the saw blade, the pump supported on the frame.

* * * * *